United States Patent [19]
Reinhold

[11] 3,880,922
[45] Apr. 29, 1975

[54] PROCESS FOR PREPARING 3-FLUORO-D-ALANINE BY ASYMMETRIC REARRANGEMENT OF 2-(AZIDOCARBONYL)-3-FLUORO-PROPIONIC ESTER OR NITRILE

[75] Inventor: Donald F. Reinhold, North Plainfield, N.J.

[73] Assignee: Merck & Co., Inc., Rahway, N.J.

[22] Filed: Feb. 3, 1972

[21] Appl. No.: 223,292

[52] U.S. Cl............ 260/534 C; 260/349; 260/465.4; 260/465.5 R; 260/465.7; 260/482 R; 260/482 C; 260/485 F; 260/487; 260/539 R; 424/319
[51] Int. Cl............................................. C07c 99/00
[58] Field of Search......... 260/534 C, 482 C, 465.7, 260/487

[56] References Cited
FOREIGN PATENTS OR APPLICATIONS
393,015  12/1964  Japan............................. 260/534 C

*Primary Examiner*—Vivian Garner
*Attorney, Agent, or Firm*—Henry H. Bassford, Jr.; J. Jerome Behan

[57] ABSTRACT

3-Fluoro-L-alanine is transformed by asymmetric conversion, via an intermediate L-2-(halo or o-tosyloxy)-3-fluoropropionic acid, to 3-fluoro-D-alanine, or by asymmetric rearrangement of a S-2-(azidocarbonyl or aminocarbonyl)-3-fluoropropionic ester or nitrile to the corresponding 2-isocyanato or ethyl urethane followed by hydrolysis. The 3-fluoro-D-alanine thus obtained is a potent antibacterial agent.

4 Claims, No Drawings

PROCESS FOR PREPARING 3-FLUORO-D-ALANINE BY ASYMMETRIC REARRANGEMENT OF 2-(AZIDOCARBONYL)-3-FLUORO-PROPIONIC ESTER OR NITRILE

This invention is concerned generally with the production of 3-fluoro-D-alanine and its pharmacologically acceptable salts which are potent antibacterial agents useful in inhibiting the growth of pathogenic bacteria of both the gram-positive and gram-negative type. More particularly, it relates to a novel asymmetric procedure whereby 3-fluoro-L-alanine is transformed to the D-isomer or whereby a 2-(azidocarbonyl or aminocarbonyl)-3-fluoropropionic ester or nitrile is rearranged to the corresponding (D) 2-isocyanato or ethyl urethane which is then hydrolyzed to form 3-fluoro-D-alanine.

In accordance with one embodiment of the present invention, 3-fluoro-L-alanine is dissolved in strong (6N) aqueous hydrobromic acid or hydrochloric acid and sodium nitrite is added portionwise to the resulting solution. The reaction is ordinarily conducted at about 0°C., under which conditions the reaction is substantially complete in about 3 hours, to produce L-2-bromo-3-fluoro-propionic acid or L-2-chloro-3-fluoro-propionic acid, respectively. The 2-halo-3-fluoro-propionic acid is conveniently recovered from the acidic reaction solution in extraction with a water-immersible organic solvent such as methylene chloride, and evaporating the extract in vacuo; the residual L-2-halo-3-fluoro-propionic acid is purified by vacuum fractional distillation.

The L-2-bromo-3-fluoro-propionic acid or its 2-chloro analog, or if desired the related L-2-o-tosyloxy3-fluoro-propionic acid, is then reacted with ammonia or sodium azide. The reaction of the L-2-halo-3-fluoropropionic acid with ammonia is preferably carried out in a pressure vessel using liquid ammonia at about room temperature, under which conditions the reaction is ordinarily complete in about 5 days. Evaporation of the ammonia gives 3-fluoro-D-alanine which is conveniently purified by recrystallization from isopropanol-water. The reaction of the L-2-chloro- or L-2-bromo intermediate with sodium azide is preferably carried out by bringing the reactants together in dimethylformamide, and agitating the reaction mixture at substantially room temperature, under which conditions the reaction is substantially complete in about one day; the D-2-azido-3-fluoro-propionic acid thus formed is then subjected to catalytic hydrogenation whereby the 2-azido grouping is reduced to 2-amino thereby forming 3-fluoro-D-alanine. This procedure makes possible the direct conversion of the L-isomer of 3-fluoroalanine to the D-isomer. As noted hereinabove, the 3-fluoro-D-alanine is a potent and useful antibacterial, whereas the isomeric 3-fluoro-L-alanine (although possessing antibacterial action) is generally an unwanted isomer; thus instead of racemizing the L-isomer obtained by resolution of 3-fluoro-DL-alanine, followed by a further resolution of the dl-mixture thus produced; this L-isomer can be, if desired, asymmetrically converted directly to 3-fluoro-D-alanine.

In accordance with a further embodiment of this invention 3-fluoro-D-alanine can be prepared by asymmetric rearrangement of a 2-(azidocarbonyl or aminocarbonyl)-3-fluoropropionic acid ester or nitrile to the corresponding 2-isocyanato or ethylurethane followed by hydrolysis. These 2-(azidocarbonyl or aminocarbonyl)-3-fluoro-propionic acid ester or nitrile starting materials are themselves conveniently prepared starting with dimethyl methylene malonate (i.e. 2-methoxycarbonyl acrylic acid methyl ester), or from 2-cyano acrylic acid, via the intermediate carbonethoxy ester mixed anhydride of 2-carboxy-3-fluoro(propionic acid methyl ester or propionitrile), the details of which are fully set forth in illustrative example 3 hereinbelow.

The following examples illustrate methods of carrying out the present invention, but it is to be understood that these examples are given for purposes of illustration and not of limitation.

EXAMPLE 1

3-Fluoro-L-alanine (21.4 g) is dissolved in 250 ml of 6N hydrobromic acid. The solution is cooled to 0°C. and sodium nitrite (22 g) is added in small portions with maintenance of temperature at 0°–5°C. After completing the addition, the reaction is maintained at 0°C for 3 hours. The solution is extracted with methylene chloride which is then dried over magnesium sulfate. The methylene chloride is evaporated in vacuo. The residual L-2-bromo-3-fluoropropionic acid is purified by vacuum fractional distillation.

L-2-Bromo-3-fluoropropionic acid (3.0 g) is charged to a steel bomb and 30 ml of liquid ammonia is added. The bomb is sealed and allowed to stand at room temperature for five days. The ammonia is evaporated and the crude 3-fluoro-D-alanine is purified by recrystallization from 50% isopropanol-water.

Alternatively, the L-2-bromo-3-fluoro-propionic acid (2.0) g is dissolved in 20 ml of dimethyl formamide. Sodium azide (1.0 g) is added, and the mixture stirred at 25°C for 24 hours. The mixture is poured into water and extracted with ether. The ether extract is washed with water and dried. About 20 ml of ethanol is added to the filtrate, and the resulting solution of D-2-azido-3-fluoro-propionic acid is reacted with hydrogen in the presence 0.5 g of 5% palladium-on-carbon. The catalyst is filtered, and the solvent is evaporated in vacuo to give crude 3-fluoro-D-alanine, which is purified by crystallization from 50% aqueous isopropanol.

EXAMPLE 2

3-Fluoro-L-alanine (21.4 g) is dissolved in 250 ml of 6N hydrochloric acid. The solution is cooled to 0°C. and sodium nitrite (22 g) is added in small portions with maintenance of temperature of 0°–5°C. After completing the addition, the reaction is maintained at 0°C for 3 hours. The solution is extracted with methylene chloride which is then dried over magnesium sulfate. The methylene chloride is evaporated in vacuo. The residual L-2-chloro-3-fluoropropionic acid is purified by vacuum fractional distillation.

L-2-Chloro-3-fluoropropionic acid (3.0 g) is charged to a steel bomb and 30 ml of liquid ammonia is added. The bomb is sealed and allowed to stand at room temperature for five days. The ammonia is evaporated and the crude 3-fluoro-D-alanine is purified by recrystallization from 50% isopropanol-water.

Alternatively, the L-2-Chloro-3-fluoro-propionic acid (2.0) g is dissolved in 20 ml of dimethyl formamide. Sodium azide (1.0 g) is added, and the mixture stirred at 25°C for 24 hours. The mixture is poured into water and the D-2-azido-3-fluoro-propionic acid is catalytically hydrogenated and the product purified, as described in example 1, to give 3-fluoro-D-alanine.

Instead of L-2-chloro-3-fluoro-propionic acid, L-2-0-tosyloxy-3-fluoro-propionic acid may be employed in the reaction with liquid ammonia set forth hereinabove.

EXAMPLE 3

About 50 grams of dimethyl methylene malonate (i.e. 2-methoxycarbonyl acrylic acid methyl ester) is added to 200 ml anhydrous hydrogen fluoride at a temperature below minus 20°C. The hydrogen fluoride is evaporated and 500 ml. of ether is added. The ether solution is washed with ice water, dried and filtered. The filtrate is evaporated to dryness, and the residual oil distilled in vacuo to give substantially pure dimethyl ester of 2-fluoromethyl malonic acid (i.e. methyl 2-methoxycarbonyl-3-fluoropropionate).

Exactly 16.4 g of this methyl 2-methoxycarbonyl-3 - fluoro-propionate is dissolved in 100 ml of methanol, 10 ml. of 1N aqueous sodium hydroxide solution is added while maintaining the temperature at 0°C, thereby forming an aqueous methanolic solution containing the sodium salt of methyl 2-carboxy -3- fluoropropionate. This solution is neutralized with dilute aqueous hydrochloric acid, extracted with chloroform, and the chloroform solution dried and then evaporated in vacuo to give methyl 2-carboxy -3- fluoropropionate.

About 15 grams of this is dissolved in methanol-benzene the stoichiometric equivalent of L-α-methylbenzylamine is added, and the resulting diastereoisomeric salts of the methyl 2-carboxy -3- fluoropropionate are separated by fractional crystallization. The L-α-methylbenzylamine salt of methyl S-2-carboxy -3-fluoropropionate thus obtained is reacted in aqueous solution with exactly one stoichiometric equivalent of aqueous hydrochloric acid, the resulting aqueous solution is extracted with chloroform, and the chloroform extract is dried and evaporated in vacuo to give methyl S-2-carboxy-3-fluoropropionate.

About 3.0 g of methyl S-2-carboxy-3-fluoropropionate is dissolved in 25 ml of acetone, and the solution is treated at 0°C first with 2.02 g of triethylamine and then with excess ethylchloroformate; to the resulting mixture is added 10 ml of water, and the solution is stirred at 0°C for about 30 minutes thereby forming an aqueous acetone solution containing the corresponding carboethoxy ester mixed anhydride of methyl S-2-carboxy-3-fluoropropionate. To this solution is added 1.3 g of sodium azide, and the mixture is stirred for an additional two hour period at a temperature of −5° to 0°C. The reaction mixture is poured into ice-cold saturated aqueous sodium chloride solution, and the aqueous mixture extracted repeatedly with ether. The ether solution containing the methyl S-2-azidocarbonyl-3-fluoropropionate is dried over anhydrous sodium sulfate and filtered, and 100 ml of dioxane is added; the ether is then evaporated, and the resulting dioxane solution is heated cautiously to boiling (behind a protective barrier) whereupon the azide decomposes and rearranges to form methyl S-2-isocyanato-3-fluoropropionate, i.e., N-carbonyl-3-fluoro-D-alanine methyl ester.

To this isocyanate is added 100 ml of water and 50 ml of concentrated aqueous hydrochloric acid, and the mixture is heated under reflux for a period of two hours, under which conditions both the isocyanate and methyl ester groupings are hydrolyzed. The aqueous reaction solution is evaporated in vacuo to give crude 3-fluoro-D-alanine hydrochloride (S)-3-fluoroalanine hydrochloride).

The hydrochloride salt of 3-fluoro-D-alanine is dissolved in water, and the solution is passed through a strongacid cation-exchange resin ($H^+$cycle). The column is washed with water to remove the chloride ions, and the column is eluted with dilute aqueous ammonium hydroxide. The eluate is evaporated, and the precipitated material is recovered by filtration, dried and recrystallized from 50% aqueous isopropanol to give substantially pure 3-fluoro-D-alanine (S-3-fluoroalanine).

Alternatively, if the methyl S-2-azidocarbonyl-3-fluoropropionate is decomposed in ethanol solution, there is formed the corresponding ethyl urethane of 3-fluoro-D-alanine methyl ester (ethyl urethane of S-3-fluoroalanine methyl ester), The latter is then reacted with aqueous hydrochloric acid to form 3-fluoro-D-alanine hydrochloride which is converted to 3-fluoro-D-alanine as described hereinabove.

Optically active compounds in this example are sometimes designated "R" and "S" according to IUPAC Tentative Rules for the Nomenclature of Organic Chemistry; Section E Fundamental Stereochemistry, J. Org. Chem 35 p. 2863–7 (1970).

Similarly, the carboethoxy ester mixed anhydride of methyl S-2-carboxy-3-fluoropropionate is reacted with ammonia (instead of sodium azide) thereby forming methyl S-2-aminocarbonyl-3-fluoropropionate, which is then reacted with sodium hypobromite thereupon the amido grouping rearranges to give, where dioxane is used as the solvent, methyl S-2-isocyanato-3-fluoropropionate; and, where ethanol is used as the solvent, the corresponding ethyl urethane of 3-fluoroD-alanine, i.e., N-ethoxycarbonyl-3-fluoro-D-alanine.

Alternatively, and in accordance with the foregoing procedure, 2-cyano-acrylic acid is reacted with hydrogen fluoride to form 2-carboxy-3-fluoropropionitrile, which is separated into its stereoisomers utilizing L-α-methylbenzylamine as resolving agent to form S-2-carboxy-3-fluoropropionitrile, which is converted to the mixed anhydride, and the latter reacted with sodium azide, as described above, to give S-2-azidocarbonyl-3-fluoro-propionitrile. The latter is heated thereby decomposing the azide and forming S-2-isocyanato-3-fluoro-propionitrile which is then heated under reflux with aqueous hydrochloric acid (as in the hydrolysis of methyl S-2-isocyanato 3-fluoro-propionate), thereby hydrolyzing both the isocyanate and nitrile groupings to produce 3-fluoro-D-alanine hydrochloride.

Alternatively, optically active D-2-amino-3-fluoropropionitrile compounds are obtained by resolution of the corresponding DL-2-amino-3-fluoropropionitrile compound. For example, DL-2-amino-3-fluoro-propionitrile per se is resolved utilizing an optically-active resolving agent such as tartaric acid, camphor-10-sulfonic acid, and the like, thereby forming the optically-active salt of D-2-amino-3-fluoropropionitrile which, upon treatment with aqueous ammonia, is converted to the free D-2-amino-3-fluoropropionitrile which is extracted from the aqueous solution with ether. The D-2-amino-3-fluoropropionitrile is then reacted at below 0°C with fortified (50% HCl) aqueous hydrochloric acid to form D-2-amino-3-fluoro-propionamide, the latter is heated with concentrated aqueous hydrochloric acid under reflux to form the hydrochloride salt of 3-fluoro-D-alanine.

What is claimed is:

1. The process which comprises asymmetrically rearranging S-2-(azidocarbonyl)-3-fluoropropionic methyl ester or nitrile, said rearrangement being conducted by heating said compound to boiling in a solution of dioxane or ethanol, thereby forming the corresponding S-2-isocyanato or ethyl urethane, and heating the latter under reflux with aqueous hydrochloric acid, thereby hydrolyzing both the isocyanate and ester or nitrile groupings to produce 3-fluoro-D-alanine.

2. The process as defined in claim 1 wherein S-2-(azidocarbonyl)-3-fluoropropionitrile is heated in dioxane solution to form S-2-isocyanato-3-fluoropropionitrile, and the latter is heated under reflux with aqueous hydrochloric acid, thereby hydrolyzing both the isocyanate and nitrile groupings to produce 3-fluoro-D-alanine hydrochloride.

3. The process, as defined in claim 1, wherein methyl S-2-(azidocarbonyl)-3-fluoropropionate is heated in dioxane solution thereby forming methyl S-2-isocyanato-3-fluoropropionate which is hydrolyzed with concentrated aqueous hydrochloric acid to 3-fluoroD-alanine.

4. The process, as defined in claim 1, wherein methyl S-2-(azidocarbonyl)-3-fluoropropionate is heated in ethanol solution thereby forming the ethyl urethane of 3-fluoro-D-alanine methyl ester which is hydrolyzed with concentrated hydrochloric acid to 3-fluoro-D-alanine.

* * * * *